United States Patent [19]

Mackovjak et al.

[11] Patent Number: 5,392,882
[45] Date of Patent: Feb. 28, 1995

[54] DYNAMIC ABSORBER SUSPENSION STRUT

[75] Inventors: John M. Mackovjak, Romeo, Mich.; Christopher J. Martone, Orlando, Fla.

[73] Assignee: General Motors Corporation, Detroit, Mich.

[21] Appl. No.: 253,814

[22] Filed: Jun. 3, 1994

Related U.S. Application Data

[63] Continuation of Ser. No. 12,867, Feb. 3, 1993, abandoned.

[51] Int. Cl.6 .............................................. F16F 9/30
[52] U.S. Cl. .................................. 188/268; 188/299
[58] Field of Search ............... 188/299, 313, 315, 318, 188/275, 280, 281, 285, 268; 267/226; 280/668

[56] References Cited

U.S. PATENT DOCUMENTS

| 1,492,328 | 4/1924 | Lang | 188/275 |
|---|---|---|---|
| 1,526,169 | 2/1925 | Melchior | 188/275 |
| 1,640,634 | 8/1927 | Wise . | |
| 1,792,493 | 2/1931 | Hallett . | |
| 2,705,634 | 4/1955 | Sampson et al. | 267/9 |
| 2,861,795 | 11/1958 | Blake | 267/8 |
| 2,875,731 | 3/1959 | Settles et al. | 121/13 |
| 3,319,741 | 5/1967 | Hauck | 188/275 |
| 3,414,092 | 12/1968 | Sopeckhart | 188/275 |
| 3,722,639 | 3/1973 | Keijzer et al. | 188/315 |
| 3,854,387 | 12/1974 | Steckle | 188/268 X |
| 4,126,302 | 11/1978 | Curnutt | 267/8 |
| 4,235,317 | 11/1980 | Maciejewski | 267/152 X |
| 4,310,149 | 1/1982 | Camilleri | 267/136 |
| 4,351,515 | 9/1982 | Yoshida | 267/8 |
| 4,786,037 | 11/1988 | Mills | 267/226 |
| 4,821,849 | 4/1989 | Miller | 188/280 |
| 4,925,198 | 5/1990 | Ito et al. | 280/89 |
| 4,936,423 | 6/1990 | Karnopp | 188/313 X |
| 4,974,794 | 12/1990 | Aubry et al. | 244/17.27 |
| 5,020,781 | 6/1991 | Huang | 188/280 X |
| 5,098,120 | 3/1992 | Hayashi et al. | 280/710 |
| 5,160,160 | 11/1992 | Kawabata | 188/299 X |

Primary Examiner—Robert J. Oberleitner
Assistant Examiner—Peter M. Poon
Attorney, Agent, or Firm—Anthony L. Simon

[57] ABSTRACT

A dynamic absorber suspension strut includes a sealed hydraulic damper mounted in an outer tube. An absorber mass is supported on a spring inside the outer tube. The absorber mass divides an interior of the outer tube into first and second fluid chambers. A fluid conduit is provided between the chambers. A control valve controls fluid flow in the fluid conduit to provide a desired damping of wheel hop frequencies. The damper is tuned to provide a desired damping of body frequencies.

6 Claims, 5 Drawing Sheets

DYNAMIC ABSORBER SUSPENSION STRUT

This is a continuation of application Ser. No. 08/012867, filed on Feb. 3, 1993, now abandoned.

BACKGROUND OF THE INVENTION

1. Field of the Invention

The present invention relates generally to vehicular suspensions systems, and in particular is concerned with a dynamic absorber combined with a hydraulic damper to provide desired damping of the sprung and unsprung portions of a vehicle.

2. Description of the Related Art

Conventional vehicular suspension systems include springs mounted between the wheels and the body and pneumatic tires which provide a spring force between the wheels and the ground. Many systems utilize hydraulic dampers, i.e., shock absorbers and struts, to dampen oscillations that occur due to road inputs and body motions.

Two distinct ranges of oscillations occur in suspension systems. First, the frequency of the sprung mass (vehicular body and any load it carries) results in a "basic ride frequency" of approximately 1-2 Hz. Second, the frequency of oscillations of the unsprung mass (wheels, tires, axles, brakes, and a portion of each spring) is in the range of approximately 12-14 Hz. The higher frequency of the unsprung mass is commonly known as "wheel hop."

A high or firm damping rate is desirable to reduce the effect of wheel hop on driving stability and comfort. A low or soft damping rate is desirable to dampen the relatively lower frequency of the body. Traditionally, a hydraulic damper is tuned at one setting to address both frequencies of the suspension system, oftentimes compromising between ride comfort and stability to provide a desired type of ride to a driver and passengers.

The art continues to seek improvements. It is desirable to provide economical, hydraulic dampers to independently control both body and wheel hop frequencies. Furthermore, it is desirable to provide such dampers in a package suitable for conventional damper mounting arrangements.

SUMMARY OF THE INVENTION

The present invention includes a combined dynamic absorber and hydraulic damper referred to as a dynamic absorber suspension strut which dampens wheel hop separately from body oscillations of a vehicle. The combined absorber and damper is particularly well-suited for McPherson strut-type systems wherein a strut is mounted between a sprung body and a control arm pivotally connected to a chassis. The combined absorber and damper replaces a conventional McPherson strut and is suitable for existing independent suspension systems. The combined absorber and damper provides greater ride comfort by lowering the transmission of vibrations to the body.

In a preferred embodiment, a dynamic absorber suspension strut includes a sealed hydraulic damper mounted in an outer tube. An absorber mass is supported on a spring inside the outer tube. The absorber mass divides an interior of the outer tube into first and second fluid chambers. A fluid conduit is provided between the chambers. A control valve controls fluid flow in the fluid conduit to provide a desired damping of wheel hop frequencies. The damper is tuned to provide a desired damping of body frequencies.

DETAILED DESCRIPTION OF THE PREFERRED EMBODIMENTS

Figure 1:
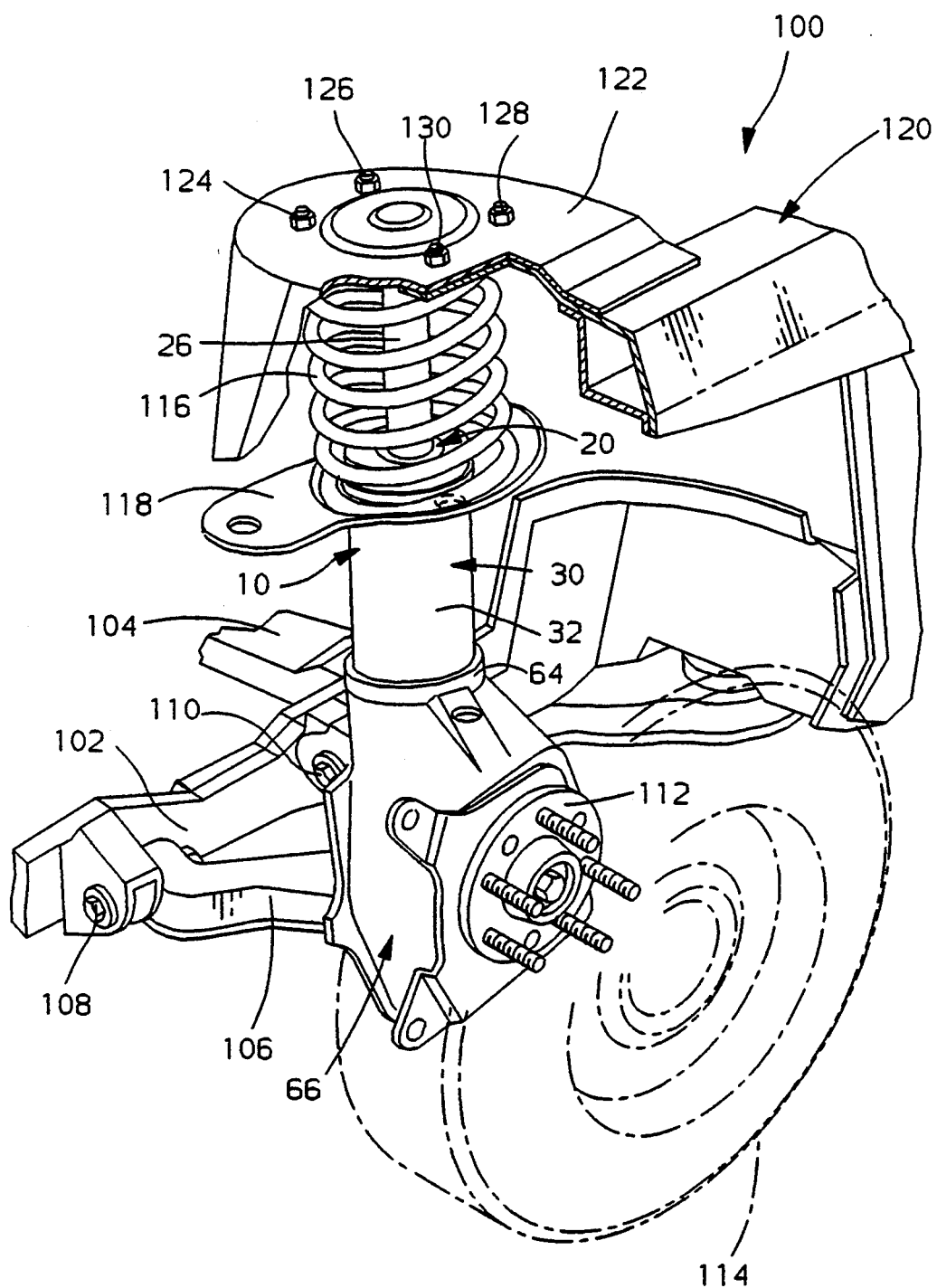
FIG. 1 is a perspective view of a preferred embodiment of a dynamic absorber suspension strut in a front suspension system wherein steering linkages and a brake caliper have been removed for clarity of illustration.

A vehicular suspension system is indicated generally at 100 in FIG. 1. A longitudinal suspension support 102 is secured to or formed as part of the vehicular chassis. A transverse cross-member 104 spans the width of the chassis to another longitudinal suspension support (not illustrated) in a well-known manner. A control arm 106 is pivotally connected to the suspension support 102 by a pair of threaded bolts 108 and 110 secured by respective nuts which act as pivot axes. Each bolt 108 and 110 preferably includes an elastomeric bushing (not illustrated) to isolate the control arm 106 from the suspension support 102.

A dynamic absorber suspension strut indicated generally at 10 is pivotally mounted on a conventional ball joint (not illustrated) on the control arm 106. The dynamic absorber suspension strut 10 rotatably mounts a hub and bearing assembly 112, which in turn mounts a wheel and tire illustrated in phantom at 114.

Figure 2:
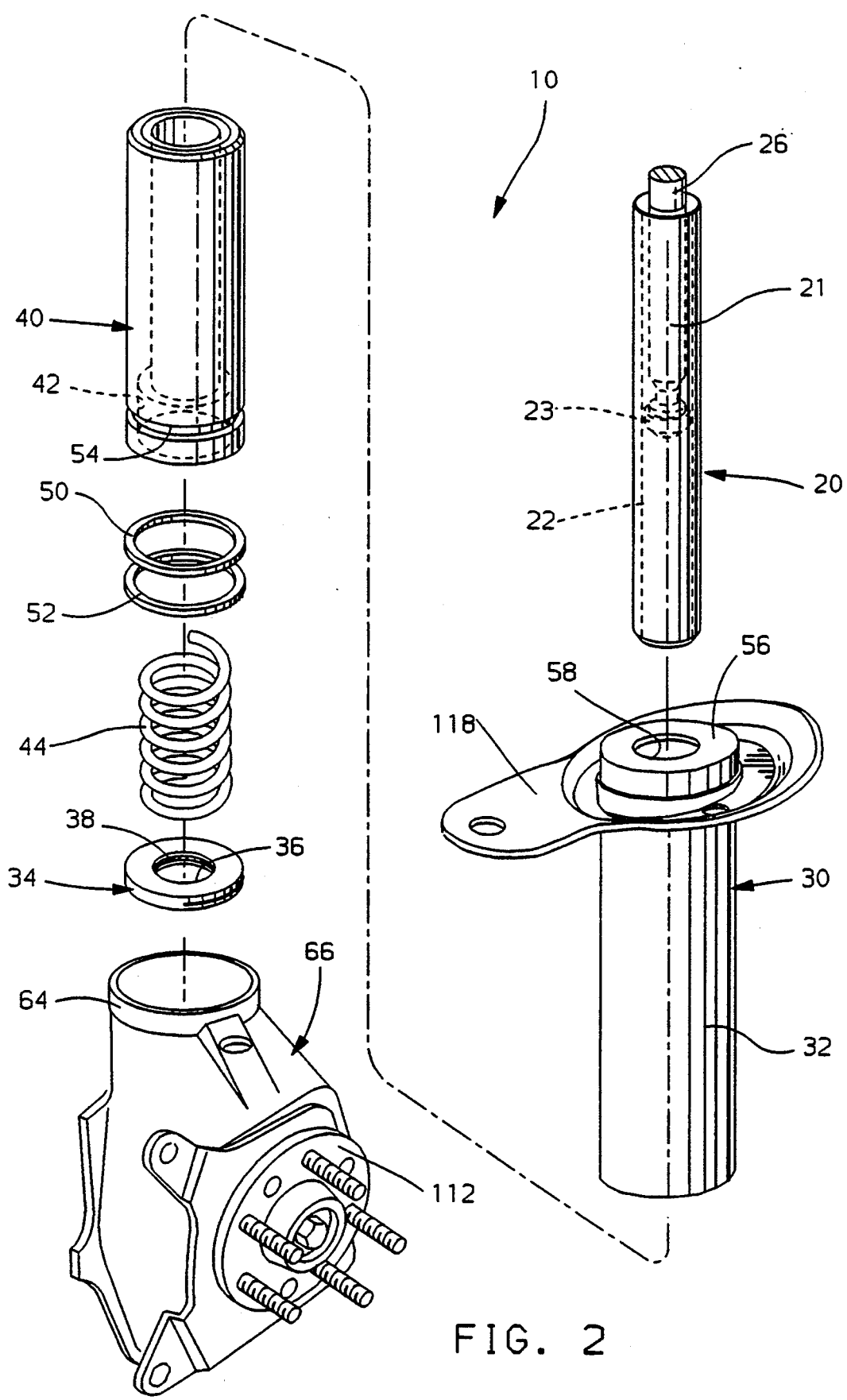
FIG. 2 is an exploded perspective view of the dynamic absorber suspension strut removed from the suspension system of FIG. 1.

As illustrated in the exploded view of FIG. 2, the dynamic absorber suspension strut 10 includes a well-known hydraulic damper indicated generally at 20 mounted within a dynamic absorber indicated generally at 30. As described below, the damper 20 acts to damp sprung body motions in the range of approximately 1-2 Hz while the dynamic absorber 30 dampens unsprung mass vibrations in the range of approximately 12-14 Hz from a wheel assembly.

A suspension spring 116 is seated on a lower spring seat 118 and provides a spring force upwardly against a vehicular body 120. The upper end of the damper 20 is secured to a mounting tower 122 formed in the body 120 by an elastomeric mount assembly (not illustrated) to isolate the damper 20 from the body 120. A plurality of threaded bolts 124, 126, 128, and 130 and respective nuts secure the mount assembly to the mounting tower 122.

Figure 3:
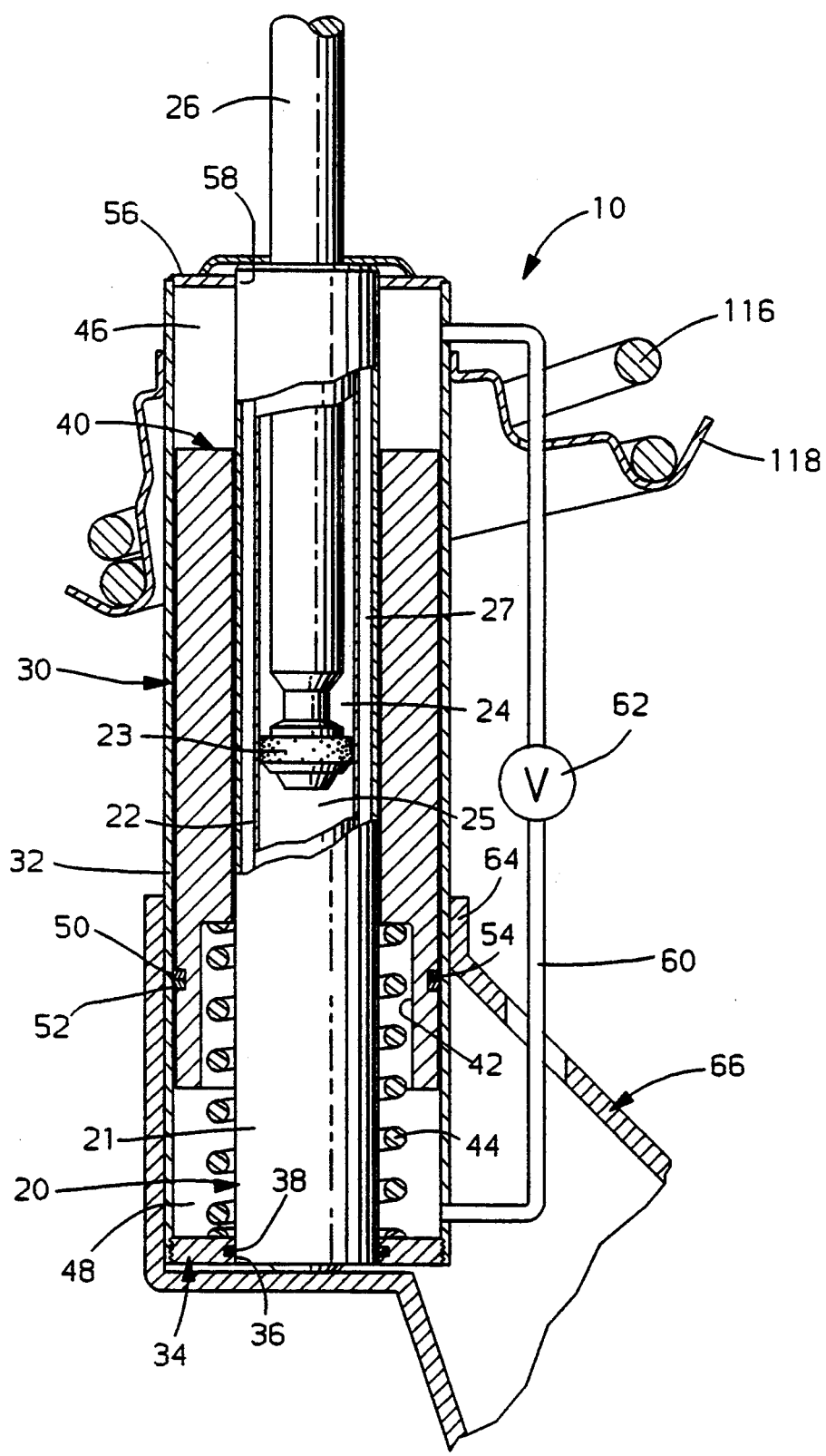
FIG. 3 is a longitudinal sectional view of the assembled dynamic absorber suspension strut of FIGS. 1 and 2 illustrating a bidirectional valve in a fluid conduit.

As illustrated best in FIG. 3, the damper 20 includes a closed reservoir tube 21 concentrically mounting an inner cylinder 22. A piston 23 having conventional fluid valving is slidably mounted in the inner cylinder 22 and divides an interior of the inner cylinder 22 into an upper fluid chamber 24 and a lower fluid chamber 25. A lower end of a piston rod 26 is secured to the piston 23 while an upper end of the piston rod 26 extends upwardly beyond the reservoir tube 21 to the mount assembly.

A lower end of the inner cylinder 22 is closed by a well-known base valve assembly (not illustrated). A fluid reservoir 27 is formed by the annular chamber between the inner cylinder 22 and the reservoir tube 21. As the damper 20 compresses and extends during operation, valving in the piston 23 controls fluid flow between the upper and lower chambers 24 and 25. The base valve assembly controls fluid flow between the lower chamber 25 and the reservoir 27. The piston and base valve assemblies can be tuned to provide desired fluid flow rates, and thus, desired damping rates. The operation of such a damper 20 is well-known by persons skilled in the art of vehicular suspensions.

The damper 20 is combined with a dynamic absorber 30 to provide desired wheel and body suspension rates. The dynamic absorber 30 includes an outer tube 32 closed at its lower end by a threaded end cap 34. A central opening 36 in the end cap 34 seats a lower end of the reservoir tube 21. If desired, the reservoir tube 21 can be secured to the end cap 34 by suitable means including welding. An O-ring 38 seated in an annular groove at the opening 36 provides a fluid seal between the end cap 34 and the reservoir tube 21.

An absorber mass 40 formed as a hollow, cylindrical member is slidably mounted in the outer tube 32. An annular interior cavity 42 is provided at the lower end of the absorber mass 40. A coil spring 44 encircles a lower portion of the reservoir tube 21 and is seated at its lower end on the end cap 34. The upper end of the coil spring 44 is seated in the interior cavity 42 so that the absorber mass 40 is supported on the coil spring 44. The coil spring 44 has a selected spring force so that the absorber mass 40 is sprung upwardly from the end cap 34.

The absorber mass 40 divides an interior of the outer tube 32 into upper and lower fluid chambers 46 and 48. A pair of O-rings 50,52 are received in a complementary circumferential groove 54 formed in the absorber mass 40. The upper end of the outer tube 32 is sealingly closed by an end cap 56 which has a central opening 58 receiving the reservoir tube 21. Any suitable means can be used to provide a seal at opening 58. The fluid chambers 46 and 48 are connected by a conduit 60 which transfers fluid between the chambers 46 and 48. A bidirectional valve 62 controls the flow of fluid between the chambers 46 and 48 to provide damping.

The lower end of the outer tube 32 is seated and secured in a tubular portion 64 of a knuckle 66 which is rotatably mounted on the lower control arm 106 by a conventional ball joint (not illustrated). The hub and bearing assembly 112 is secured to the knuckle 66 and mounts the wheel and tire 114.

When a road input is received by the wheel and tire 114, the vibration is transmitted to the dynamic absorber 30 by the knuckle 66. As the outer tube 32 is forced upwardly, the spring 44 is forced upwardly. The inertia of the absorber mass 40 initially resists the upward motion of the spring 44. As fluid is forced from the lower chamber 48 to the upper chamber 46 via the conduit 60, the absorber mass 40 acts to dampen the vibration input. Spring 44 and absorber mass 40 are tuned to absorb the suspension wheel hop frequency in the range of approximately 12 Hz. The valve 62 is used to provide damping between the absorber mass 40 and the unsprung mass (wheel and tire 114).

Figure 4:
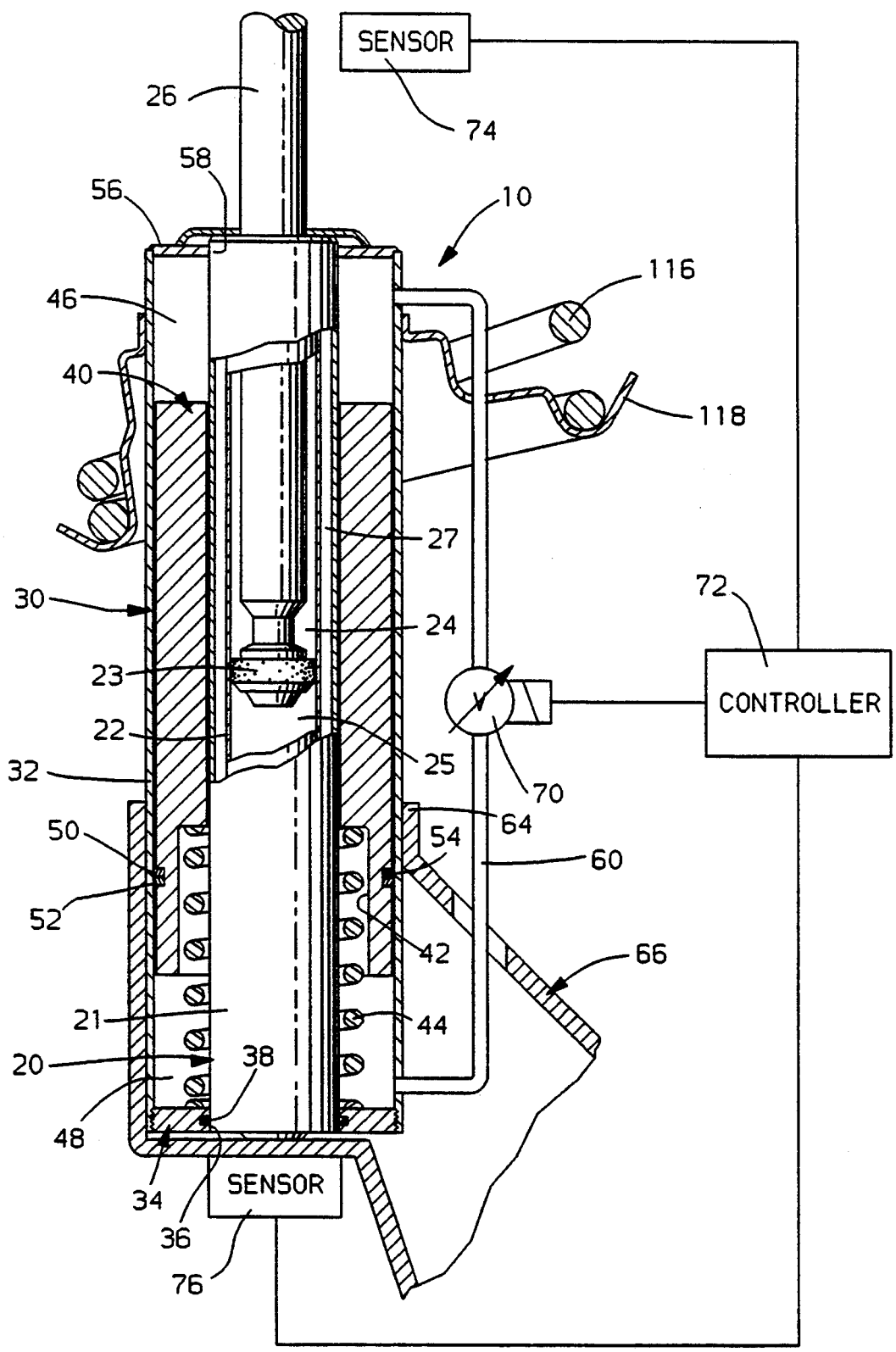
FIG. 4 is a longitudinal sectional view of the dynamic absorber suspension strut of FIGS. 1-3 wherein an electromechanical valve and controller have replaced the bidirectional valve.

The valve 62 can be of any suitable type to control flow between the chambers 46 and 48. For example, in the embodiment illustrated in FIG. 4, the valve 62 of the dynamic absorber suspension strut 10 of FIGS. 1–3 has been replaced with an electromechanical valve 70. A controller 72 receives inputs from sensors such as a body accelerometer 74 and a strut accelerometer 76 and controls the valve 70. With the electromechanical valve 70, an additional degree of control permits the inertia of the absorber mass 40 to absorb inputs anytime the unsprung mass (wheel and tire 114) is moving in an undesired direction, which is an advancement over attenuating the frequency (approximately 12 Hz) at which the spring 44 is tuned.

Figure 5:
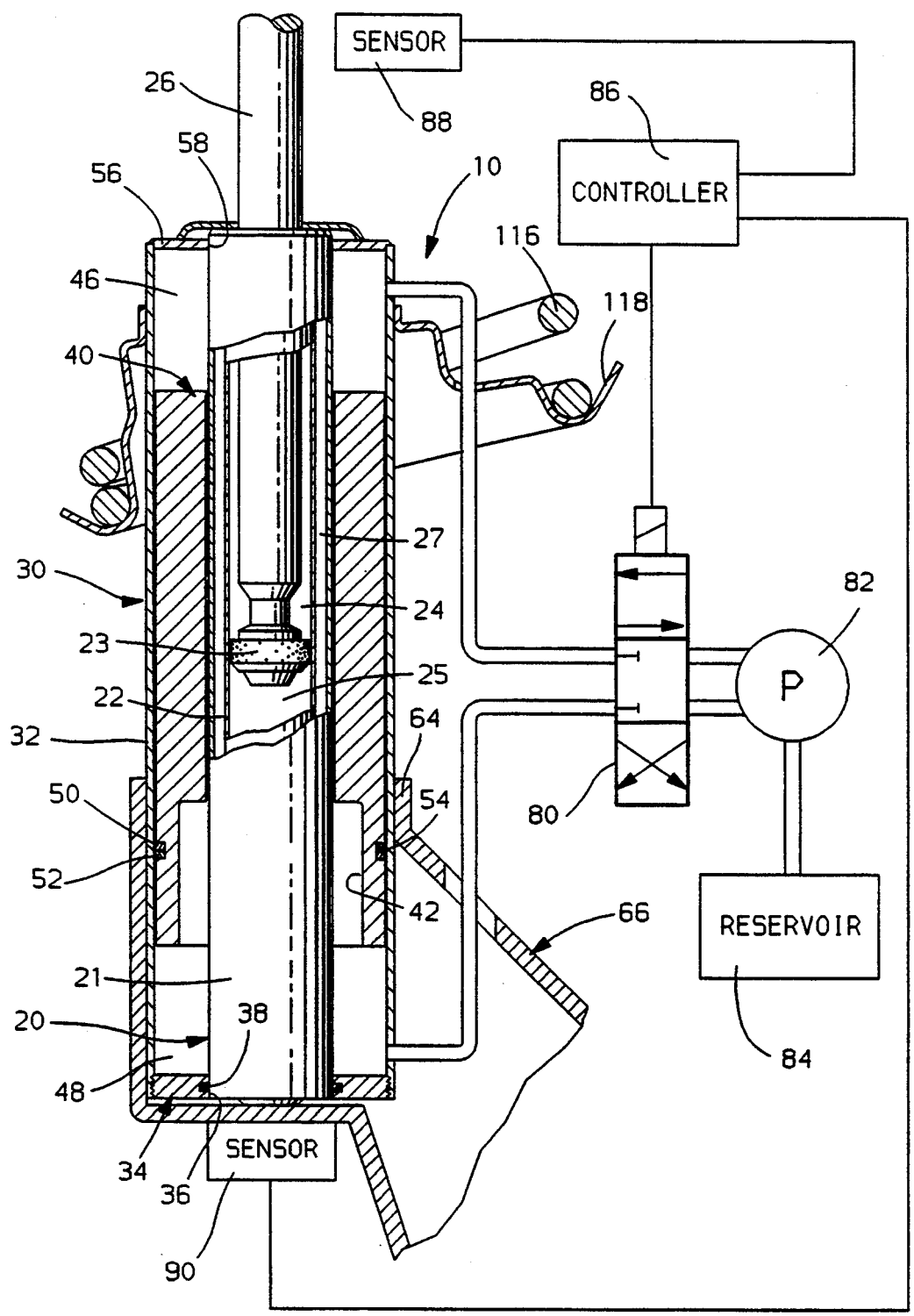
FIG. 5 is a longitudinal sectional view of the dynamic absorber suspension strut of FIGS. 1-3 wherein a pump, servo valve and controller have replaced the bidirectional valve.

In the embodiment illustrated in FIG. 5, the valve 62 of the dynamic absorber suspension strut 10 of FIGS. 1–3 has been replaced with a servo valve 80 connected to a pump 82, a reservoir 84 and a controller 86. Spring 44 has been removed from between the absorber mass 40 and the end cap 34. The controller 84 receives inputs from sensors such as a body accelerometer 88 and a strut accelerometer 90 and controls the flow of fluid into and out of the fluid chambers 46 and 48. If desired, bumpers (not illustrated) can be positioned on the inner surfaces of the end caps 34 and 56. The position of absorber mass 40 is actively controlled by the servo valve 80 and controller 86.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A dynamic absorber suspension strut comprising:
   (a) a sealed hydraulic damper having a piston slidably mounted in a cylinder;
   (b) an outer tube within which the cylinder of the hydraulic damper is fixedly mounted;
   (c) a support surface at one end of the outer tube, fixed with respect to the outer tube;.
   (d) a spring having an end seated on the support surface;
   (e) an absorber mass reciprocally mounted inside the outer tube and urged by the spring away from the support surface, wherein the absorber mass hydraulically divides an interior of the outer tube into first and second fluid chambers, wherein the fluid chambers of the outer tube are not in fluid communication with the damper; and
   (f) a conduit providing fluid communication between the first and second chambers, wherein the absorber mass and spring are tuned to absorb suspension wheel hop frequency vibrations.

2. An apparatus comprising:
   a cylindrical tube mounted to a lower suspension member of a vehicle;
   a sealed hydraulic damper including a piston on an end of a piston rod slidably mounted in a cylinder, wherein the piston divides an interior of the cylinder into an upper fluid chamber and a lower fluid chamber and includes a valve that controls fluid flow between the upper and lower fluid chambers, wherein the cylinder is fixedly mounted within and coaxial with the cylindrical tube and the piston rod is mounted to a body of the vehicle;

an annular passage interior of the cylindrical tube and exterior of the cylinder, wherein the annular passage is not in fluid communication with the upper and lower fluid chambers;

an absorber mass formed as a hollow cylindrical member slidably mounted in the annular passage;

a coil spring having a first end fixedly mounted to a bottom end of the annular passage, the coil spring encircling a lower portion of the cylinder and having a second end maintaining the absorber mass sprung upwardly from the bottom end of the passage, wherein the spring and absorber mass are tuned to absorb predetermined vehicle suspension frequency vibrations, wherein the sealed hydraulic damper provides fluid damping of suspension reciprocation and wherein the absorber mass and coil spring provide dynamic absorption of suspension reciprocation.

3. The apparatus of claim 2 wherein the predetermined suspension frequency is a suspension wheel hop frequency.

4. The apparatus of claim 3 wherein the suspension wheel hop frequency is in the range of approximately 12 Hz.

5. An apparatus comprising:

a cylindrical tube mounted to a lower suspension member of a vehicle;

a sealed hydraulic damper including a piston on an end of a piston rod slidably mounted in a cylinder, wherein the piston divides an interior of the cylinder into an upper fluid chamber and a lower fluid chamber and includes a valve that controls fluid flow between the upper and lower fluid chambers, wherein the cylinder is fixedly mounted within and coaxial with the cylindrical tube and the piston rod is mounted to a body of the vehicle;

an annular passage interior of the cylindrical tube and exterior of the cylinder, wherein the annular passage is not in fluid communication with the upper and lower fluid chambers;

an absorber mass formed as a hollow cylindrical member slidably mounted in the annular passage;

a coil spring having a first end fixedly mounted to a bottom end of the annular passage, the coil spring encircling a lower portion of the cylinder and having a second end maintaining the absorber mass sprung upwardly from the bottom end of the passage, upper and lower annular fluid chambers within the annular passage above and below the absorber mass, respectively;

a conduit for providing fluid communication between the upper and lower annular fluid chambers;

wherein the spring and absorber mass are tuned to absorb predetermined vehicle suspension frequency vibrations, wherein the sealed hydraulic damper provides fluid damping of suspension reciprocation, wherein the absorber mass and coil spring provide dynamic absorption of suspension reciprocation, and wherein the conduit providing fluid communication between the upper and lower annular fluid chambers provides damping of reciprocating movement of the absorber mass.

6. An apparatus comprising:

a cylindrical tube mounted to a lower suspension member of a vehicle;

a sealed hydraulic damper including a piston on an end of a piston rod slidably mounted in a cylinder, wherein the piston divides an interior of the cylinder into an upper fluid chamber and a lower fluid chamber and includes a valve that controls fluid flow between the upper and lower fluid chambers, wherein the cylinder is fixedly mounted within and coaxial with the cylindrical tube and the piston rod is mounted to a body of the vehicle;

an annular passage interior of the cylindrical tube and exterior of the cylinder, wherein the annular passage is not in fluid communication with the upper and lower fluid chambers;

an absorber mass formed as a hollow cylindrical member slidably mounted in the annular passage;

a coil spring having a first end fixedly mounted to a bottom end of the annular passage, the coil spring encircling a lower portion of the cylinder and having a second end maintaining the absorber mass sprung upwardly from the bottom end of the passage;

upper and lower annular fluid chambers within the annular passage above and below the absorber mass, respectively;

a conduit for providing fluid communication between the upper and lower annular fluid chambers;

a bi-directional controllable valve providing control of the fluid communication between the upper and lower annular fluid chambers wherein the spring and absorber mass are tuned to absorb predetermined vehicle suspension frequency vibrations, wherein the sealed hydraulic damper provides fluid damping of suspension reciprocation, wherein the absorber mass and coil spring provide dynamic absorption of suspension reciprocation, and wherein the conduit providing fluid communication between the upper and lower annular fluid chambers and the bi-directional controllable valve provides damping of reciprocating movement of the absorber mass.

* * * * *